INVENTOR.
ALBERT J. C. FORSYTH
BY Knox & Knox

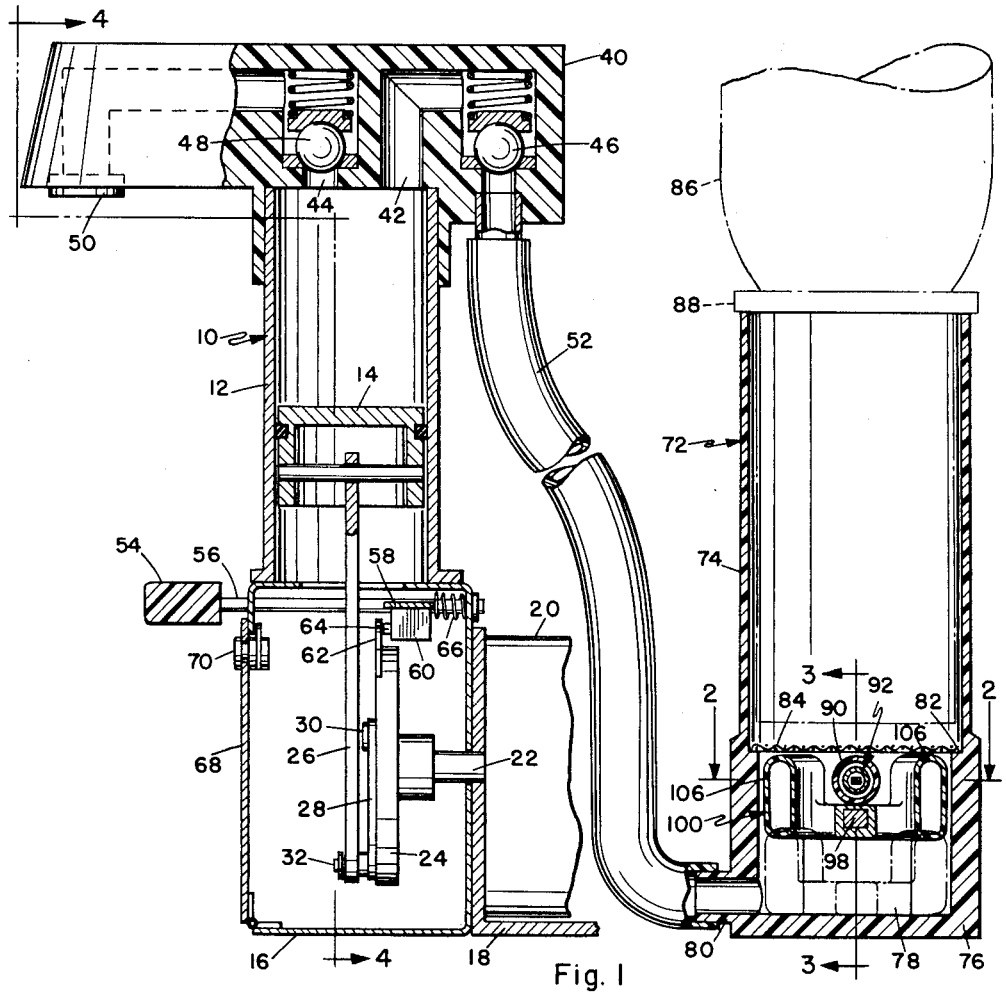

United States Patent Office 3,149,753
Patented Sept. 22, 1964

3,149,753
LIQUID DISPENSING MACHINE
Albert J. C. Forsyth, Coronado, Calif., assignor to Courtesy Products Corporation, San Diego, Calif., a corporation of California
Filed Jan. 8, 1962, Ser. No. 164,788
1 Claim. (Cl. 222—63)

The present invention relates generally to measuring and dispensing means and more particularly to a liquid dispensing machine, the adaptability to the type of machines usually termed vending machines being recognized.

The primary object of this invention is to provide a liquid dispensing machine which will deliver an accurately measured quantity of liquid at each operation, until the liquid supply is depleted to a level insufficient to complete a full delivery, at which time the machine automatically shuts off to prevent dispensation of a short measure of liquid.

Another object of this invention is to provide, for use in a liquid dispensing machine or the like, a novel liquid level sensing means in which the electrical circuitry is completely isolated from the liquid and which is instantly responsive to a drop in liquid level below that necessary for proper delivery.

A further object of this invention is to provide a liquid dispensing machine which contains a minimum number of parts, but is capable of automatic operation, one complete cycle of delivery and refill each time the mechanism is operated.

Finally, it is an object to provide a liquid dispensing machine of the aforementioned character which is simple and convenient to manufacture and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a vertical sectional view of the delivery machine and associated liquid reservoir, the liquid content being omitted for clarity;

FIGURE 2 is a sectional view taken on line 2—2 of FIGURE 1;

FIGURE 3 is a sectional view taken on line 3—3 of FIGURE 1;

Structure of Delivery Machine

The delivery portion of the apparatus is illustrated and described in my co-pending application for a Liquid Measuring and Dispensing Machine, Serial No. 52,995, filed August 30, 1960, and is hereinafter described in sufficient detail to clarify the operation of the now improved apparatus as a whole.

Figure 4:
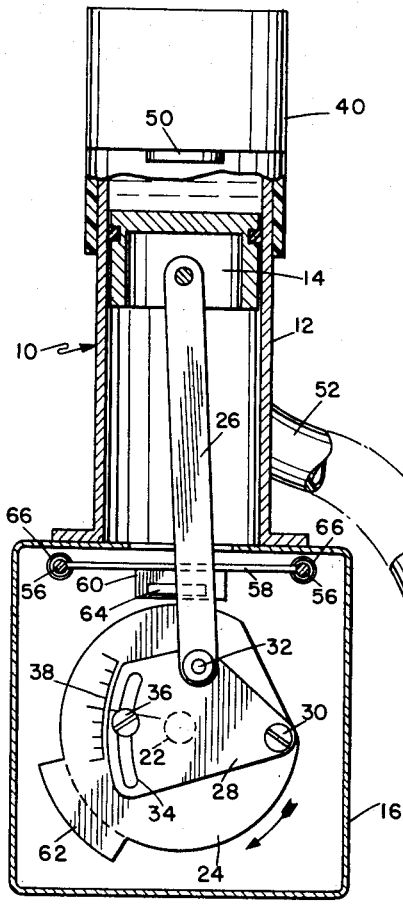
FIGURE 4 is a sectional view taken on line 4—4 of FIGURE 1.

The delivery machine 10, best-illustrated in FIGURES 1 and 4, comprises a pump 11 having an upright cylinder 12 containing a piston 14, the cylinder being mounted on a box-like casing 16 secured to a bracket 18. On the bracket 18 is a motor 20 having a shaft 22 geared to rotate at low speed, said shaft carrying a crank disc 24 which drives piston 14 through a connecting rod 26. Fixed to crank disc 24 is a crank plate 28 pivotally attached at an end by a pin 30 adjacent the edge of said crank disc, the crank plate having thereon a crank pin 32 to which connecting rod 26 is attached. The crank plate 28 has an arcuate slot 34, the radius of which is concentric with pin 30, and extending through said slot into crank disc 24 is a lock screw 36. By swinging crank plate 28, the throw of crank pin 32 relative to shaft 22 can be varied, so controlling the stroke of piston 14. Graduation markings 38 are provided on crank disc 24 corresponding to the volumetric displacement at various strokes of piston 14, so facilitating accurate setting of the quantity of liquid delivered at each stroke.

On top of the cylinder 12 is a delivery head 40 containing an inlet 42 and an outlet 44, fitted with suitable non-return valves 46 and 48, respectively, so that the liquid can be pumped only in one direction. Outlet 44 leads to a delivery nozzle 50, while inlet 42 is connected to a supply pipe 52.

The machine is operated by a push bar 54 located below delivery nozzle 50, so that a glass, cup or other container pressed against the bar will be in position to receive the liquid. The push bar 54 is mounted on rods 56 extending from front to rear through the upper portion of casing 16, said rods being connected adjacent the rear ends by a cross bar 58 on which is mounted an actuating switch 60 of the press or micro-switch type. The crank disc 24 has a radially extended lobe 62 which, in the static or inoperative position of the mechanism, has its rear face engaging and depressing the plunger 64 of actuating switch 60, as in FIGURE 1. The push bar assembly is biased forwardly by springs 66 to ensure proper contact of the actuating switch 60 with lobe 62, said switch being thus held in open or off position, the electrical circuitry being described in detail hereinafter.

The casing 16 may be fitted with a hinged door 68 secured by a lock 70 for access to the crank assembly, in order to adjust delivery, and any suitable housing or cover may be used to enclose the unit, if necessary.

Structure of Reservoir

The reservoir 72, illustrated in FIGURES 1, 2, 3 and 5, is basically an upright cylindrical tank 74 with a thickened base portion 76 containing a supply chamber 78, from which an outlet 80 leads to the supply pipe 52. At the upper end of supply chamber 78 is a shoulder 82 on which is supported a screen 84 to filter out foreign matter. The tank 74 can be filled with liquid or may be supplied from an inverted bottle 86 held in a retaining sleeve 88, both indicated in broken line.

Extending diametrically across the supply chamber 78 is a non-metallic sleeve 90, preferably of plastic which is inert to the liquids to be used, said sleeve being sealed to the supply chamber walls at both ends. Inside the sleeve 90 is a cut-off switch 92 of magnetically actuated type, such as the reed switch made by C. P. Clare & Co. for use in special types of relays. In this particular switch, a pair of resilient metallic reeds 94 and 95 are enclosed in a sealed container 96, the ends of the reeds within the container being overlapped but normally separated. The container 96 is fixed in position in sleeve 90 so that the reeds 94 and 95 are vertically separated. The outer ends of the reeds are terminals for connection in an electrical circuit. The cut-off switch 92 is operated by a bar magnet 98 contained in a float 100, comprising a hollow body of plastic, or the like with the magnet embedded in the central portion thereof. The float 100 is non-circular, having flattened side portions 102 joined by a cross bar 104 in which magnet 98 is enclosed. The supply chamber 78 is also of non-circular cross section corresponding to the float 100, so that the float is free to move vertically, as indicated by the full and broken line positions in FIGURE 1, but cannot rotate. This is necessary in order to maintain the magnet 98 in longitudinal alignment with the cut-off switch 92. The ends of float 100 have raised portions 106 which extend upwardly on opposite sides of sleeve 90 and, by contacting screen 84, prevent undue tilting and possible jamming of the float.

The reservoir 72 may be placed adjacent the delivery machine 10 or concealed remotely by extending the supply pipe 52.

Electrical System

Figure 6:
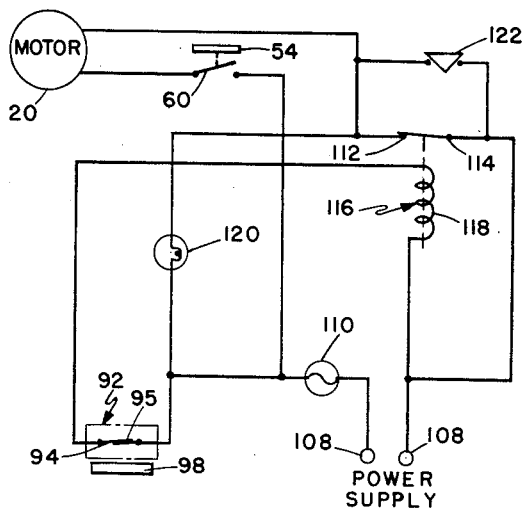
FIGURE 6 is an electrical wiring diagram of the machine.

Referring now to FIGURE 6 of the drawings, the machine is operated from a suitable power supply coupled to terminals 108, low voltage being preferably for safety. The motor 20 is connected to the power supply through a fuse 110 and actuating switch 60 in series, then through the contacts 112 and 114 of a relay 116. The coil 118 of relay 116 is connected to the power supply in series with cut-off switch 92. A pilot lamp 120 may also be connected in the circuit through relay contacts 112 and 114 to indicate the operable condition of the machine. For purposes to de described later, a bypass switch 122 is connected across the relay contacts for operation of the motor 20 independently of the relay.

Operation

When the reservoir 72 contains sufficient liquid, the float 100 is raised into contact with sleeve 90, as in FIGURE 1. In this position the magnet 98 is aligned longitudinally with and in close proximity to the cut-off switch 92. The magnetic field passes through the reeds 94 and 95, completing the loop of magnetic flux and making the overlapped ends of the reeds mutually attractive, since they are of opposite magnetic polarity, thus pulling the reeds together, as in FIGURE 3, and closing the electrical circuit to the relay coil 118. This in turn closes the relay and completes the circuit between contacts 112 and 114. Thus in the quiescent state, as appearing in FIGURE 6, with power on and liquid at a suitable level, the circuit has the relay 116 and cut-off switch 92 closed and the pilot lamp 122 illuminated.

Now, when the push bar 54 is pressed, the actuating switch 60 is released from lobe 62 and its open position, and closes, completing the circuit to motor 20, which turns crank disc 24. This actuates piston 14 and delivers the pre-set quantity of liquid through nozzle 50 on the upward stroke of the piston. As the piston 14 descends, liquid is drawn through inlet 42 to refill the cylinder 12. With the push bar 54 released, the lobe 62 rotates to engage the actuating switch 60, so shutting of the motor 20 at the end of complete cycle. If the push bar 54 is held in, the actuating switch 60 is held clear of lobe 62 and the pump 11 will continue to deliver repeated measured quantities of liquid until the push bar is released.

Figure 5:
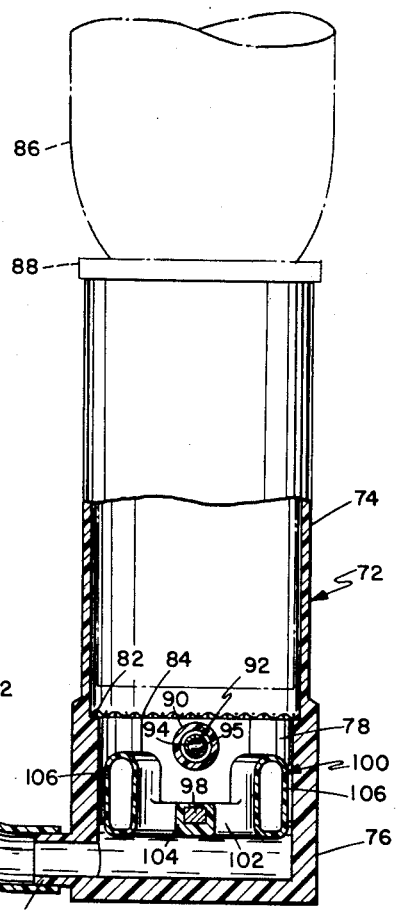
FIGURE 5 is a sectional view similar to a portion of FIGURE 1, showing the action caused by a drop in liquid level.

When the liquid in reservoir 72 drops below a certain level, at which there is insufficient liquid to refill cylinder 12 and keep the system primed, float 100 will drop away from the cut-off switch, breaking the magnetic circuit and allowing reeds 94 and 95 to separate, so opening the relay and preventing further operation of the motor. However, the float 100 will not drop until the down stroke of piston 14 draws liquid from the reservoir. Thus as long as the system is primed and cylinder 12 is full, the operation of push bar 54 will cause a full measure of liquid to be dispensed. Then, if the reservoir level is too low, the float 100 will drop and cause the machine to be shut-off at some point during the down or refill stroke of pump 11, as indicated in FIGURES 4 and 5 taken together. Since the supply chamber 78 is relatively small in cross sectional area, withdrawal of a small quantity of liquid will cause a considerable drop in level. Thus the level sensing means, comprising the float controlled, magnetically actuated switch, is extremely sensitive to drop in level below requirements, as opposed to a large tank with a float type sensor. By this action, the cylinder 12, supply pipe 52 and lower portion of the supply chamber 78 are kept primed at all times, preventing the machine from drawing air and delivering a short measure of liquid. Atmospheric pressure will prevent the liquid from draining back into the reservoir.

When more liquid is added to the reservoir, the float 100 rises, closing the cut-off switch 92 and restarting the machine, which then completes its refilling stroke automatically. If, however, it is desired to drain the machine for cleaning or to change the type of liquid being handled, the bypass switch 122 can be closed to operate the motor 20, independently of the relay circuit, until all liquid is pumped out of the system.

The machine provides accurately measured quantities of liquid delivered repetitively by merely actuating a push bar, the quantity being readily changed when necessary but being constant once set. The pump is refilled completely at each stroke so that a short measure cannot be delivered. If there is insufficient liquid to fill the pump, the machine shuts off automatically, even part way through a refilling stroke, until more liquid is added, whereupon the machine restarts automatically and completes refilling. The entire unit is compact, contains a minimum number of parts and requires very little servicing other than normal cleaning.

It is understood that minor variation from the form of the invention disclosed herein may be made without departure from the spirit and scope of the invention, and that the specification and drawing are to be considered as merely illustrative rather than limiting.

I claim:

A liquid dispensing machine comprising: a pump; a motor operatively connected to drive said pump; actuating means coupled to said motor to drive said pump through a complete delivery and refill stroke at each actuation; a liquid supply reservoir having a supply chamber connected to said pump; a normally open, magnetically actuated switch disposed across said supply chamber and sealed therefrom; a float in said supply chamber below said switch, said float being vertically movable and non-rotatable in the chamber; a magnet carried by said float which causes said switch to close when in proximity thereto, whereby when the level of liquid in said supply chamber drops below a predetermined level due to removal therefrom by the refill stroke of said pump, said magnet drops away from said switch, causing the switch to open and shut off said motor, thereby preventing incomplete refilling of said pump; a screen fixed across said supply chamber and above said switch, said float having upwardly extending end portions on opposite sides of said switch to contact said screen and prevent tilting of the float.

References Cited in the file of this patent

UNITED STATES PATENTS

| | | |
|---|---|---|
| 2,625,042 | Binford | Jan. 13, 1953 |
| 2,869,475 | Bobo | Jan. 20, 1959 |
| 2,972,434 | James | Feb. 21, 1961 |
| 3,059,586 | Brailsford | Oct. 23, 1962 |

FOREIGN PATENTS

| | | |
|---|---|---|
| 83,204 | Denmark | July 29, 1957 |